US012016804B2

(12) United States Patent
Li et al.

(10) Patent No.: US 12,016,804 B2
(45) Date of Patent: Jun. 25, 2024

(54) COLLAPSIBLE WHEELCHAIR

(71) Applicants: SHANGHAI BANGBANG ROBOTICS CO., LTD, Shanghai (CN); Jiangsu BangBang Intelligent Technology Co., Ltd., Changzhou (CN)

(72) Inventors: Jianguo Li, Shanghai (CN); Yongqiang Li, Shanghai (CN); Jie Liu, Shanghai (CN); Xiaodong Wang, Shanghai (CN); Zhefu Zhang, Shanghai (CN); Canfeng Liu, Shanghai (CN); Xiangcheng Liao, Shanghai (CN)

(73) Assignees: SHANGHAI BANGBANG ROBOTICS CO., LTD, Shanghai (CN); Jiangsu BangBang Intelligent Technology Co., Ltd., Changzhou (CN)

( * ) Notice: Subject to any disclaimer, the term of this patent is extended or adjusted under 35 U.S.C. 154(b) by 0 days.

(21) Appl. No.: 18/058,595

(22) Filed: Nov. 23, 2022

(65) Prior Publication Data

US 2023/0085749 A1 Mar. 23, 2023

Related U.S. Application Data

(63) Continuation of application No. PCT/CN2021/110322, filed on Aug. 3, 2021.

(30) Foreign Application Priority Data

Aug. 9, 2020 (CN) ......................... 202010792480.5
Aug. 9, 2020 (CN) ......................... 202010792491.3

(51) Int. Cl.
*A61G 5/00* (2006.01)
*A61G 5/08* (2006.01)

(52) U.S. Cl.
CPC ............ *A61G 5/085* (2016.11); *A61G 5/0866* (2016.11)

(58) Field of Classification Search
CPC ........ A61G 5/08; A61G 5/085; A61G 5/0866; A61G 5/0841; A61G 5/0858; A47C 4/045; A47C 7/5068; A47C 4/286; A47C 7/54
(Continued)

(56) References Cited

U.S. PATENT DOCUMENTS 4,736,960 A 4/1988 Batty et al.
4,805,931 A 2/1989 Slasor
(Continued)

FOREIGN PATENT DOCUMENTS

CN 2706147 Y 6/2005
CN 201533897 U 7/2010
(Continued)

OTHER PUBLICATIONS

Translation of CN 107822791A accessed at www.espacenet.com on Dec. 30, 2023. (Year: 2019).*
(Continued)

*Primary Examiner* — James A Shriver, II
*Assistant Examiner* — Hilary L Johns

(57) ABSTRACT

Embodiments of the present disclosure provide a collapsible wheelchair, including: a movable chassis; a chair; a chair backrest; at least one first folding mechanism, installed between the movable chassis and the chair; and at least one second folding mechanism, connected between the chair and the chair backrest; where, the at least one first folding mechanism and the at least one second folding mechanism are connected in series and both have a four-rod linkage structure, and when the collapsible wheelchair is switched from a folded state to an open state or from the open state
(Continued)

to the folded state, the at least one first folding mechanism and the at least one second folding mechanism are configured to move simultaneously. The collapsible wheelchair provided by the present disclosure is convenient in terms of the operation and easy to operate.

14 Claims, 6 Drawing Sheets

(58) Field of Classification Search
USPC .......................................................... 280/650
See application file for complete search history.

(56) References Cited

U.S. PATENT DOCUMENTS

| | | | | |
|---|---|---|---|---|
| 6,938,911 | B1 | 9/2005 | Shyu et al. | |
| 7,926,606 | B2 * | 4/2011 | Wang | B62K 5/007 280/278 |
| 8,864,222 | B2 * | 10/2014 | Grace | A47C 1/0265 297/354.12 |
| 8,998,245 | B1 | 4/2015 | Anooshian et al. | |
| 10,729,603 | B2 * | 8/2020 | Wang | B62K 5/003 |
| 2008/0245592 | A1 | 10/2008 | Wu | |
| 2008/0309046 | A1 | 12/2008 | Wang | |
| 2010/0084831 | A1 | 4/2010 | Wang | |
| 2012/0193159 | A1 | 8/2012 | Wu et al. | |
| 2018/0162480 | A1 * | 6/2018 | Zhang | B62K 3/002 |
| 2022/0071396 | A1 * | 3/2022 | Zhang | A61G 5/128 |

FOREIGN PATENT DOCUMENTS

| | | | | | |
|---|---|---|---|---|---|
| CN | 103845161 | A | | 6/2014 | |
| CN | 203920857 | U | | 11/2014 | |
| CN | 105769464 | A | | 7/2016 | |
| CN | 206642014 | U | | 11/2017 | |
| CN | 107822791 | A | * | 3/2018 | A61G 5/04 |
| CN | 107822791 | A | | 3/2018 | |
| CN | 108297927 | A | | 7/2018 | |
| CN | 207928438 | U | | 10/2018 | |
| CN | 109199721 | A | | 1/2019 | |
| CN | 109481169 | A | | 3/2019 | |
| CN | 110013395 | A | | 7/2019 | |
| CN | 110013395 | A | * | 7/2019 | |
| CN | 110063846 | A | | 7/2019 | |
| CN | 209091916 | U | | 7/2019 | |
| CN | 209203807 | U | | 8/2019 | |
| CN | 110251326 | A | | 9/2019 | |
| CN | 209776523 | U | | 12/2019 | |
| CN | 210174950 | U | | 3/2020 | |
| CN | 210991255 | U | | 7/2020 | |
| CN | 111839924 | A | | 10/2020 | |
| CN | 111839927 | A | | 10/2020 | |
| CN | 212816833 | U | | 3/2021 | |
| CN | 213157124 | U | | 5/2021 | |
| CN | 214049397 | U | | 8/2021 | |
| DE | 10 2014 112 153 | B3 | | 2/2016 | |
| FR | 37302 | E | | 11/1930 | |
| IN | 111839928 | A | | 10/2020 | |
| JP | 2000024045 | A | | 1/2000 | |
| JP | 2002177340 | A | | 6/2002 | |
| JP | 2002282085 | A | | 10/2002 | |
| JP | 2003079668 | A | | 3/2003 | |
| JP | 3164650 | U | | 12/2010 | |
| KR | 10-2018-0052046 | A | | 5/2018 | |
| KR | 10-2019-0024417 | A | | 3/2019 | |
| KR | 10-2020-0021243 | A | | 2/2020 | |

OTHER PUBLICATIONS

The evaluation report for Chinese Patent Application No. ZL2020216380961, dated Feb. 20, 2023.
The Office Action for Chinese Patent Application No. 202180005031.4, dated Apr. 8, 2023.
The Notice of Reasons for Refusal for Japanese Patent Application No. 2022-552312, dated Mar. 30, 2023.
The Notice of Allowance for Korean Patent Application No. 10-2022-7029441, dated Mar. 2, 2023.
Notice of Grant of Patent Right for Invention and Notice of Registration dated Sep. 3, 2023 regarding Chinese Application No. 202180005031.4.
Notice of Second Review Opinion dated Jul. 7, 2023 regarding Chinese Application No. 202180005031.4.
International Search Report and Written Opinion dated Oct. 26, 2021 for PCT application No. PCT/CN2021/110322.
Request for the Submission of an Opinion dated Sep. 19, 2022 for related Korean Patent Application No. 10-2022-7029441.
The First Office Action dated Feb. 3, 2024 for Chinese Application No. 202311283551.9.
Notification of Grant of Patent Rights for Invention Application dated Apr. 21, 2024 for Application No. 2023112835519.
The Extended European Search Report dated Mar. 27, 2024 for Application No. 21855410.3.

* cited by examiner

COLLAPSIBLE WHEELCHAIR

CROSS-REFERENCE TO RELATED APPLICATIONS

This application is a continuation of International Application No. PCT/CN2021/110322, filed on Aug. 3, 2021, which claims priority to Chinese Patent Application No. 202010792480.5, filed on Aug. 9, 2020 and Chinese Patent Application No. 202010792491.3, filed on Aug. 9, 2020. The contents of the above applications are incorporated herein by reference in their entireties.

TECHNICAL FIELD

The present disclosure relates to a technical field of a folding mechanism and a wheelchair, in particular to a collapsible wheelchair.

BACKGROUND

A wheelchair is a chair equipped with wheels to help replace walking, and is an important mobile tool for home rehabilitation, turnaround transportation, medical treatment and going out for the wounded, sick and disabled. Wheelchairs can not only meet the transportation needs of people with physical disabilities and mobility difficulties, but also facilitate family members to move and take care of the sick, so that the sick can exercise and participate in social activities with the help of wheelchairs.

Wheelchairs have been the means of transportation for people with lower limb movement disability for a long time, which can be generally divided into electric wheelchairs and manual wheelchairs. In order to make it more convenient for users to use, the types of wheelchairs are becoming more and more diversified, for example, more and more collapsible wheelchairs have appeared for the convenience of users to take along with.

SUMMARY

The present disclosure provides a collapsible wheelchair, which can be switched from an open state to a folded state or from the folded state to the open state by only once-through operation, and the operation is convenient and easy to operate.

An embodiment of the present disclosure provides a collapsible wheelchair, including:

- a movable chassis;
- a chair;
- a chair backrest;
- at least one first folding mechanism, installed between the movable chassis and the chair; and
- at least one second folding mechanism, connected between the chair and the chair backrest;
- where, the at least one first folding mechanism and the at least one second folding mechanism are connected in series and both have a four-rod linkage structure, and when the collapsible wheelchair is switched from a folded state to an open state or from the open state to the folded state, the at least one first folding mechanism and the at least one second folding mechanism are configured to move simultaneously.

In an embodiment of the present disclosure, each of the first folding mechanisms includes a first support rod, a second support rod, a first connecting base and a second connecting base, where a first end of the first support rod and a first end of the second support rod are both hinged with the first connecting base, a second end of the first support rod and a second end of the second support rod are both hinged with the second connecting base, and the second connecting base is fixedly connected with the chair.

In an embodiment of the present disclosure, a position where the first support rod is hinged with the first connecting base is higher than a position where the second support rod is hinged with the first connecting base, and a position where the first support rod is hinged with the second connecting base is higher than a position where the second support rod is hinged with the second connecting base.

In an embodiment of the present disclosure, the at least one first folding mechanism has a parallelogram-like four-rod linkage structure.

In an embodiment of the present disclosure, each of the second folding mechanisms includes: a fourth support rod, a fifth support rod and a sixth support rod; where the collapsible wheelchair further includes a first extension end, a first end of the first extension end is fixedly connected with the second end of the second support rod, a second end of the first extension end is hinged with a first end of the fourth support rod, a second end of the fourth support rod is hinged with a first end of the sixth support rod, a second end of the sixth support rod is fixedly connected with the chair backrest, a first end of the fifth support rod is fixedly connected with the chair, a second end of the fifth support rod is hinged with the chair backrest.

In an embodiment of the present disclosure, the at least one second folding mechanism has an anti-parallelogram-like four-rod linkage structure.

In an embodiment of the present disclosure, a length of the fourth support rod is greater than a length of the first extension end and a length of the sixth support rod.

In an embodiment of the present disclosure, the at least one first folding mechanism includes two first folding mechanisms;

- the collapsible wheelchair further includes a first hinge rod, where the second connecting bases of the two first folding mechanisms are both provided with a first hinge hole; the second end of the first extension end and the first end of the fourth support rod are both hinged with the first hinge rod;
- when the collapsible wheelchair is switched from the folded state to the opened state, the first hinge rod extends into the first hinge holes; and when the collapsible wheelchair is switched from the open state to the folded state, the first hinge rod is separated from the first hinge holes.

In an embodiment of the present disclosure, the at least one first folding mechanism includes two first folding mechanisms;

the collapsible wheelchair further includes:

- a second hinge rod, with which the second end of the first extension end and the first end of the fourth support rod are both hinged;
- a first cross rod, connected between the first support rods of the two first folding mechanisms or between the second support rods of the two first folding mechanisms; and
- a driving mechanism, connected with the first cross rod and driving the first cross rod to move, thereby driving the two first folding mechanisms to move.

In an embodiment of the present disclosure, the collapsible wheelchair further includes a pedal plate and two third folding mechanisms respectively corresponding to the two first folding mechanisms, and each of the third folding mechanisms includes: a second extension end, a first linkage and a second linkage;

for each of the third folding mechanisms, a first end of the second extension end is hinged with the first end of the first support rod, a second end of the second extension end is hinged with a first end of the first linkage, a second end of the first linkage is hinged with a first end of the second linkage, and a second end of the second linkage is hinged with the pedal plate.

In an embodiment of the present disclosure, the collapsible wheelchair further includes a stopper, where the second linkage and the pedal plate are unidirectionally position-limited by the stopper.

In an embodiment of the present disclosure, the movable chassis is provided with a second cross rod, and the second cross rod is provided with two third linkages, the two third linkages are both provided with a second hinge hole, and the pedal plate is hinged between the two third linkages through the second hinge holes of the two third linkages.

In an embodiment of the present disclosure, the first connecting base is fixedly installed on the movable chassis, and the second connecting base is fixedly installed under the chair.

In an embodiment of the present disclosure, under the open state of the collapsible wheelchair, inclination directions of the first support rod and the second support rod are the same as an inclination direction of the chair backrest.

In an embodiment of the present disclosure, when the collapsible wheelchair is switched from the open state to the folded state, the at least one second folding mechanism is folded toward a forward direction of the collapsible wheelchair, and the at least one first folding mechanism is folded toward a direction opposite to the forward direction of the collapsible wheelchair.

In an embodiment of the present disclosure, under the folded state of the collapsible wheelchair, the movable chassis, the chair, and the chair backrest are stacked in parallel with each other.

In an embodiment of the present disclosure, the movable chassis includes a chassis frame, and under the folded state of the collapsible wheelchair, the at least one first folding mechanism is accommodated in the chassis frame.

In an embodiment of the present disclosure, the chassis frame has a quadrangular structure.

The collapsible wheelchair provided by the embodiments of the disclosure includes: a movable chassis; a chair; a chair backrest; at least one first folding mechanism, installed between the movable chassis and the chair; and at least one second folding mechanism, connected between the chair and the chair backrest; where, the at least one first folding mechanism and the at least one second folding mechanism are connected in series and both have a four-rod linkage structure, and when the collapsible wheelchair is switched from a folded state to an open state or from the open state to the folded state, the at least one first folding mechanism and the at least one second folding mechanism are configured to move simultaneously. The collapsible wheelchair provided by the present disclosure can be switched from an open state to a folded state or from the folded state to the open state by only once-through operation, and the operation is convenient and easy to operate.

BRIEF DESCRIPTION OF DRAWINGS

In order to illustrate the embodiments of the present disclosure or the technical solutions in the prior art more clearly, the drawings that need to be used in the description of the embodiments or the prior art will be briefly introduced in the following. Obviously, the drawings in the following description are some embodiments of the present disclosure, and other drawings can be obtained by those ordinary skilled in the prior art according to these drawings without paying creative effort.

It should be noted that in the attached drawings, the same reference numerals refer to the same or similar parts.

DESCRIPTION OF EMBODIMENTS

In order to make the objectives, technical solutions and advantages of the embodiments of the present disclosure clearer, the technical solutions in the embodiments of the present disclosure will be described clearly and comprehensively with reference to the drawings in the embodiments of the present disclosure. Obviously, the described embodiments are part of the embodiments of the present disclosure, rather than all embodiments of the present disclosure. Based on the embodiments in the present disclosure, all other embodiments obtained by those ordinary skilled in the prior art without creative effort belong to the protection scope of the present disclosure.

It should be noted that, in the present disclosure, unless otherwise specified and limited, the term "connected" should be understood in a broad sense, for example, it can be a hinged connection manner, and it can also be other connection manners that enable two parts to rotate with each other.

As discussed above, in order to make it more convenient for users to use, the types of wheelchairs are becoming more and more diversified, for example, more and more collapsible wheelchairs have appeared for the convenience of users to take along with. However, most of the collapsible wheelchairs sold at present are manually collapsible wheelchairs, which need multiple steps to make the collapsible wheelchairs switch from an open state to a folded state or from the folded state to the open state, and are inconvenient to use.

In view of the above problems, the present disclosure provides a collapsible wheelchair, which can be switched from an open state to a folded state or from the folded state to the open state by only once-through operation, and the operation is convenient and easy to operate.

Figure 1:
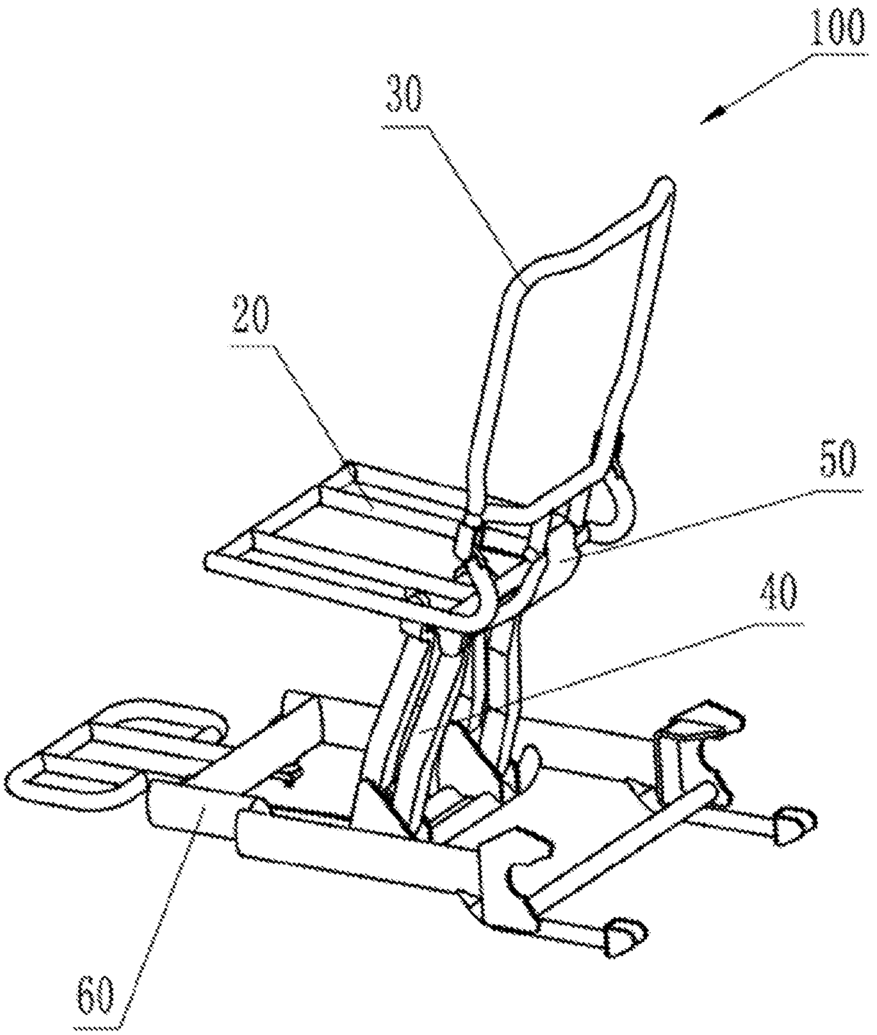
FIG. 1 is a first schematic structural diagram of a collapsible wheelchair provided by an embodiment of the present disclosure.
Figure 3:
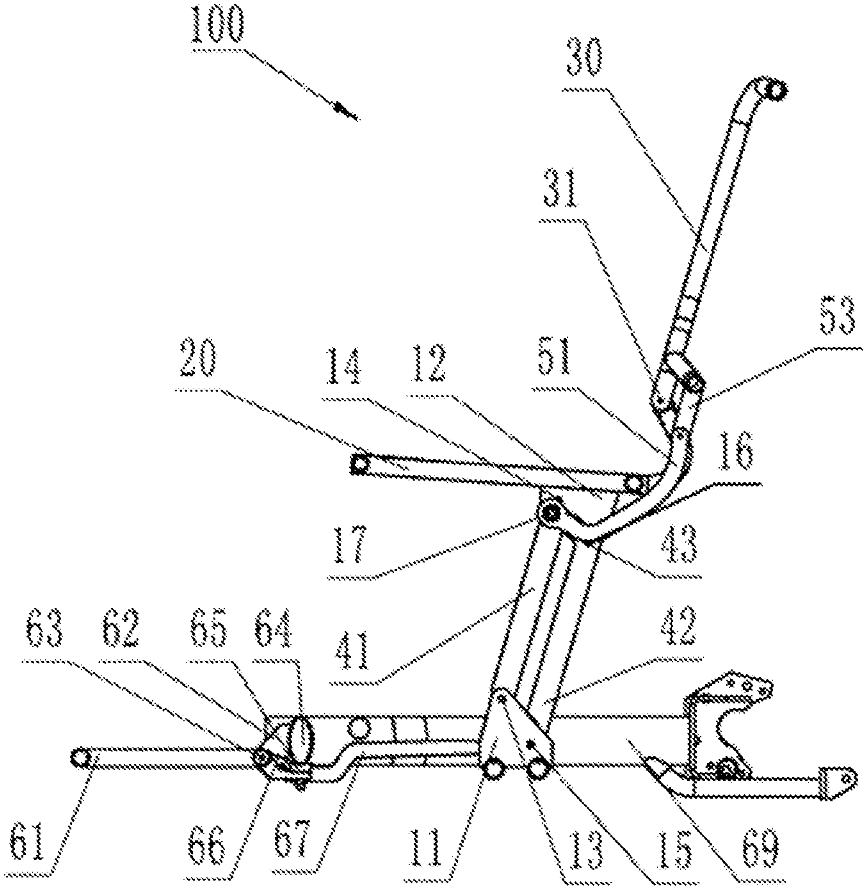
FIG. 3 is a schematic side view of a collapsible wheelchair under an open state provided by an embodiment of the present disclosure.
Figure 4:
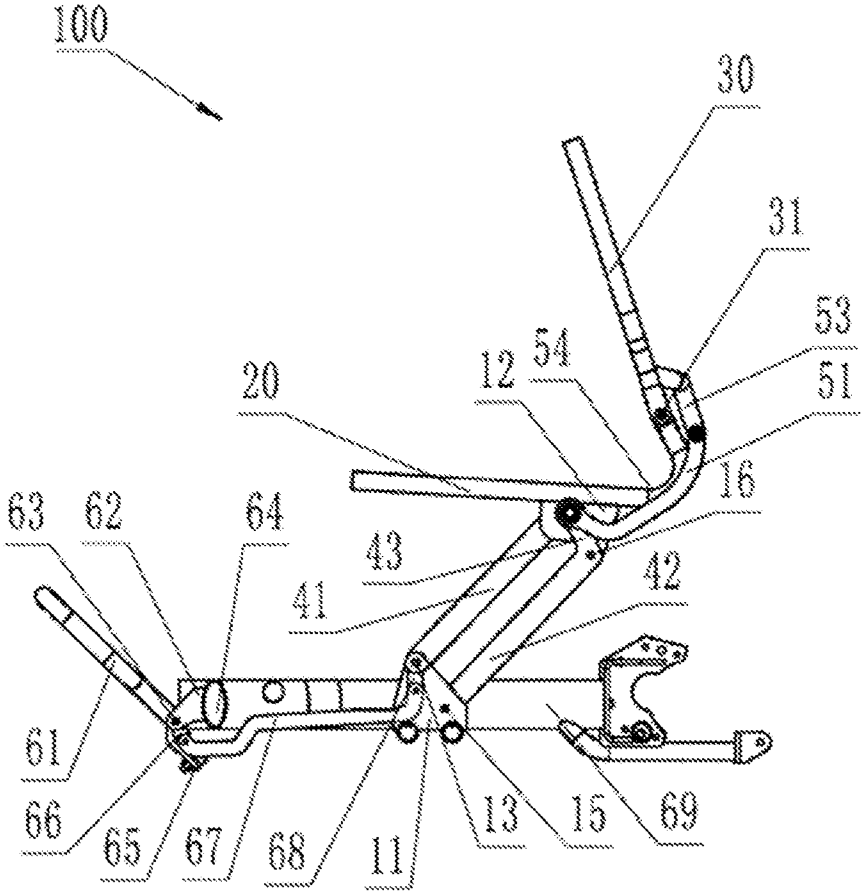
FIG. 4 is a schematic side view of a folding process of a collapsible wheelchair from an open state to a folded state provided by an embodiment of the present disclosure.
Figure 5:
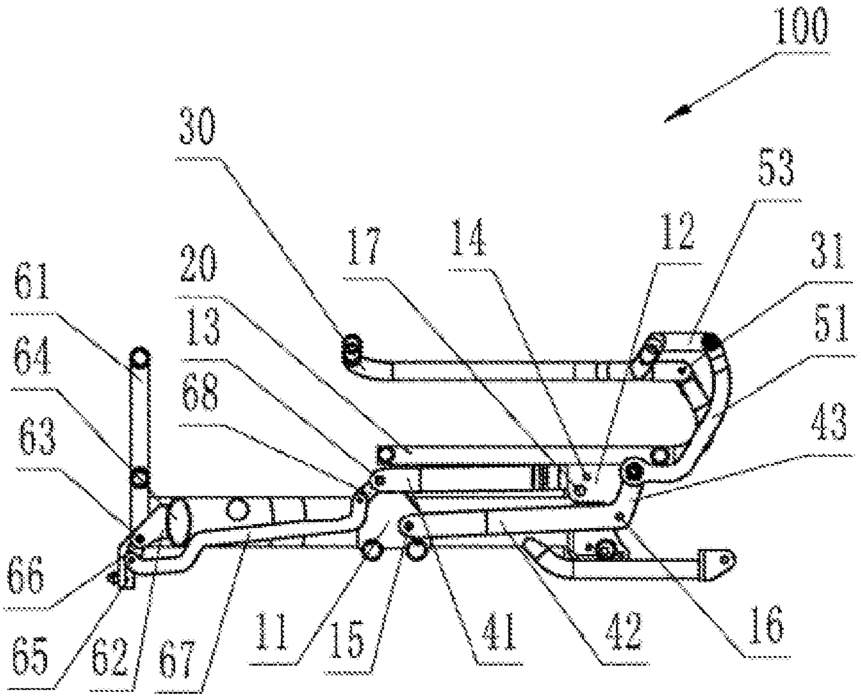
FIG. 5 is a schematic side view of a collapsible wheelchair under a folded state provided by an embodiment of the present disclosure.

An embodiment of the present disclosure provides a collapsible wheelchair 100, as shown in FIG. 1, including: a movable chassis 60 (wheels are not shown in the drawings of the specification); a chair 20; a chair backrest 30; at least one first folding mechanism 40, installed between the movable chassis 60 and the chair 20, and accommodated in the movable chassis 60 under a folded state of the collapsible wheelchair 100; and at least one second folding mechanism 50, connected between the chair 20 and the chair backrest 30; where, the at least one first folding mechanism 40 and the at least one second folding mechanism 50 are connected in series and both have a four-rod linkage structure. Generally, a four-rod linkage structure is a structure in which two connecting rods are both cranks, where the drive crank performs an isokinetic motion and the driven crank performs a variable motion. The four-rod linkage structure usually includes a parallelogram-like four-rod linkage structure and an anti-parallelogram-like four-rod linkage structure. In the present disclosure, the at least one first folding mechanism 40 can make the chair 20 switch from a folded state to an open state, or from the open state to the folded state; the at least one second folding mechanism 50 can make the chair backrest 30 switch from the folded state to the open state, or from the open state to the folded state. Since the at least one first folding mechanism 40 and the at least one second folding mechanism 50 are connected in series and both have a four-rod linkage structure, when the collapsible wheelchair 100 is switched from the folded state to the open state or from the open state to the folded state, the at least one first folding mechanism 40 and the at least one second folding mechanism 50 are configured to move simultaneously. That is, the first folding mechanism 40 and the second folding mechanism 50 can be folded or opened at the same time. For example, the at least one second folding mechanism 50 is made to be linked to the movement by swinging the at least one first folding mechanism 40 in a direction away from a horizontal plane (an upward direction as shown in FIGS. 3-5), so as to realize the switch of the collapsible wheelchair 100 from the folded state to the opened state. At this time, the at least one second folding mechanism 50 is opened toward a direction opposite to a forward direction of the collapsible wheelchair 100, and the at least one first folding mechanism 40 is opened toward the forward direction of the collapsible wheelchair 100 (a leftward direction as shown in FIGS. 3-5). The forward direction of the collapsible wheelchair 100 is, for example, a direction in which the collapsible wheelchair 100 normally travels forward. On the contrary, the at least one second folding mechanism 50 is made to be linked to the movement by swinging the at least one first folding mechanism 40 in a direction toward the horizontal plane (a downward direction as shown in FIGS. 3-5), so as to realize the switch of the collapsible wheelchair 100 from the open state to the folded state. At this time, the at least one second folding mechanism 50 is folded towards the forward direction of the collapsible wheelchair 100, and the at least one first folding mechanism 40 is folded towards the direction opposite to the forward direction of the collapsible wheelchair 100 (a rightward direction as shown in FIGS. 3-5).

The collapsible wheelchair provided by the present disclosure can be switched from an open state to a folded state or from the folded state to the open state by only once-through operation, and the operation is convenient and easy to operate. Drive force may be applied to the first folding mechanism 40, or applied to the second folding mechanism 50, or applied to both of the first folding mechanism 40 and the second folding mechanism 50.

As shown in FIGS. 2-6, at least one first folding mechanism 40 has a parallelogram-like four-rod linkage structure, and at least one second folding mechanism 50 has an anti-parallelogram-like four-rod linkage structure. It should be understood that the at least one first folding mechanism

40 and the at least one second folding mechanism 50 can also adopt other four-rod linkage structures, as long as they can be folded.

As shown in FIG. 5, under the folded state of the collapsible wheelchair 100, the movable chassis 60, the chair 20, and the chair backrest 30 are stacked in parallel with each other.

The switch of the first folding mechanism 40 between the folded state and the open state can be driven by a telescopic rod or manually driven by a user. The telescopic rod can be a push-rod motor, an electric telescopic rod, a hydraulic telescopic rod, a pneumatic telescopic rod or a gas-liquid mixing telescopic rod sold on the market. The present disclosure does not specifically limit the specific installation position of the telescopic rod, as long as it can drive the first folding mechanism 40 to switch between the folded state and the opened state.

Similar to the first folding mechanism 40, the switch of the second folding mechanism 50 between the folded state and the opened state can be driven by a telescopic rod or manually driven by a user. The telescopic rod can be a push-rod motor, an electric telescopic rod, a hydraulic telescopic rod, a pneumatic telescopic rod or a gas-liquid mixing telescopic rod sold on the market. The present disclosure does not specifically limit the specific installation position of the telescopic rod, as long as it can drive the second folding mechanism 50 to switch between the folded state and the opened state.

Driving the first folding mechanism 40 can make the second folding mechanism 50 linked to the movement, whereas driving the second folding mechanism 50 can also make the first folding mechanism 40 linked to the movement.

In an embodiment of the present disclosure, under the open state of the collapsible wheelchair 100, inclination directions of the first support rod 41 and the second support rod 42 are the same as an inclination direction of the chair backrest 30, in this way, it is more convenient to fold the first folding mechanism 40 and thus fold the collapsible wheelchair 100.

As shown in FIGS. 2-6, the first folding mechanism 40 has a four-rod linkage structure, each of the first folding mechanisms 40 includes a first support rod 41, a second support rod 42, a first connecting base 11 and a second connecting base 12, where a first end of the first support rod 41 and a first end of the second support rod 42 are both hinged with the first connecting base 11, and a second end of the first support rod 41 and a second end of the second support rod 42 are both hinged with the second connecting base 12, and the second connecting base 12 is fixedly connected with the chair 20.

Specifically, the first end of the first support rod 41 can be hinged with the first connecting base 11 through an A hinge hole 13, the second end can be hinged with the second connecting base 12 through a B hinge hole 14, the first end of the second support rod 42 can be hinged with the first connecting base 11 through a C hinge hole 15, and the second end can be hinged with the second connecting base 12 through a D hinge hole 16.

In an embodiment of the present disclosure, the first connecting base 11 is fixedly installed on the movable chassis 60, and the second connecting base 12 is fixedly installed under the chair 20, in this way, the collapsible wheelchair 100 is more stable, and when the collapsible wheelchair 100 is switched between the open state and the folded state, the folding of the at least one first folding mechanism 40 and the at least one second folding mechanism 50 is more convenient and faster. Specifically, the first connecting base 11 can be directly and fixedly installed on the movable chassis 60, or can be removably and fixedly installed on the movable chassis 60 through a connecting apparatus, and the second connecting base 12 can be directly and fixedly installed under the chair 20, or can be removably and fixedly installed under the chair 20 through a connecting apparatus.

In an embodiment of the present disclosure, as shown in FIG. 5, the chair 20 is parallel to the horizontal plane, and the first support rod 41 and the second support rod 42 are arranged obliquely in a vertical direction, in this way, it is more convenient to fold the first folding mechanism 40 and thus fold the collapsible wheelchair 100. Specifically, a position where the first support rod 41 is hinged with the first connecting base 11 is higher than a position where the second support rod 42 is hinged with the first connecting base 11, and a position where the first support rod 41 is hinged with the second connecting base 12 is higher than a position where the second support rod 42 is hinged with the second connecting base 12. That is, in the first connecting base 11, a location of the A hinge hole 13 is higher than a location of the C hinge hole 15; and in the second connecting base 12, a location of the B hinge hole 14 is higher than a location of the D hinge hole 16.

In another embodiment of the present disclosure, in order to fold the first folding mechanism 40 more conveniently, and then the collapsible wheelchair 100 can be folded in the following way, so as to make the chair 20 parallel to the horizontal plane and make the first support rod 41 and the second support rod 42 arranged obliquely in the vertical direction: instead of being directly connected with the first connecting base 11, the first support rod 41 is hinged with a connecting piece firstly, and the connecting piece is in turn fixedly connected with the first connecting base 11. At this time, a location of the A hinge hole 13 is the same as a location of the C hinge hole 15.

As shown in FIGS. 2-6, the second folding mechanism has a four-rod linkage structure, and each of the second folding mechanisms 50 includes a fourth support rod 51, a fifth support rod 54 and a sixth support rod 53; the collapsible wheelchair 100 further includes a first extension end 43, where a first end of the first extension end 43 is fixedly connected with the second end of the second support rod 42, in this way, when the second support rod 42 moves, the first extension end 43 directly follows the movement and the first extension end 43 can be suspended and fixed, thereby a series connection between the at least one first folding mechanism 40 and the at least one second folding mechanism 50 is formed, thus the chair backrest 30 is supported. Specifically, the first end of the first extension end 43 may be integrally formed with the second end of the second support rod 42, or may be fixedly connected with the second end of the second support rod 42 by other means. It should be noted that, as long as the first end of the first extension end 43 can be fixedly connected with the second end of the second support rod 42, the present disclosure does not specifically limit the fixed connection manner between them.

In addition, a second end of the first extension end 43 is hinged with a first end of the fourth support rod 51, a second end of the fourth support rod 51 is hinged with a first end of the sixth support rod 53, a second end of the sixth support rod 53 is fixedly connected with the chair backrest 30, a first end of the fifth support rod 54 (shown as an elbow between the chair 20 and the chair backrest 30 in the drawings) is fixedly connected with the chair 20, a second end of the fifth support rod 54 is hinged with the chair backrest 30, for example, through a hinge point 31.

In this embodiment of the present disclosure, the first folding mechanism 40 and the second folding mechanism 50 are connected in series through the first extension end 43, so as to realize that the second folding mechanism 50 is also switched from the folded state to the open state at the same time when the first folding mechanism 40 is switched from the folded state to the open state, and the second folding mechanism 50 is also switched from the open state to the folded state at the same time when the first folding mechanism 40 is switched from the open state to the folded state.

In an embodiment of the present disclosure, a length of the fourth support rod 51 is greater than a length of the first extension end 43 and a length of the sixth support rod 53, in this way, it is more convenient to fold the first folding mechanism 40 and thus fold the collapsible wheelchair 100.

Figure 2:
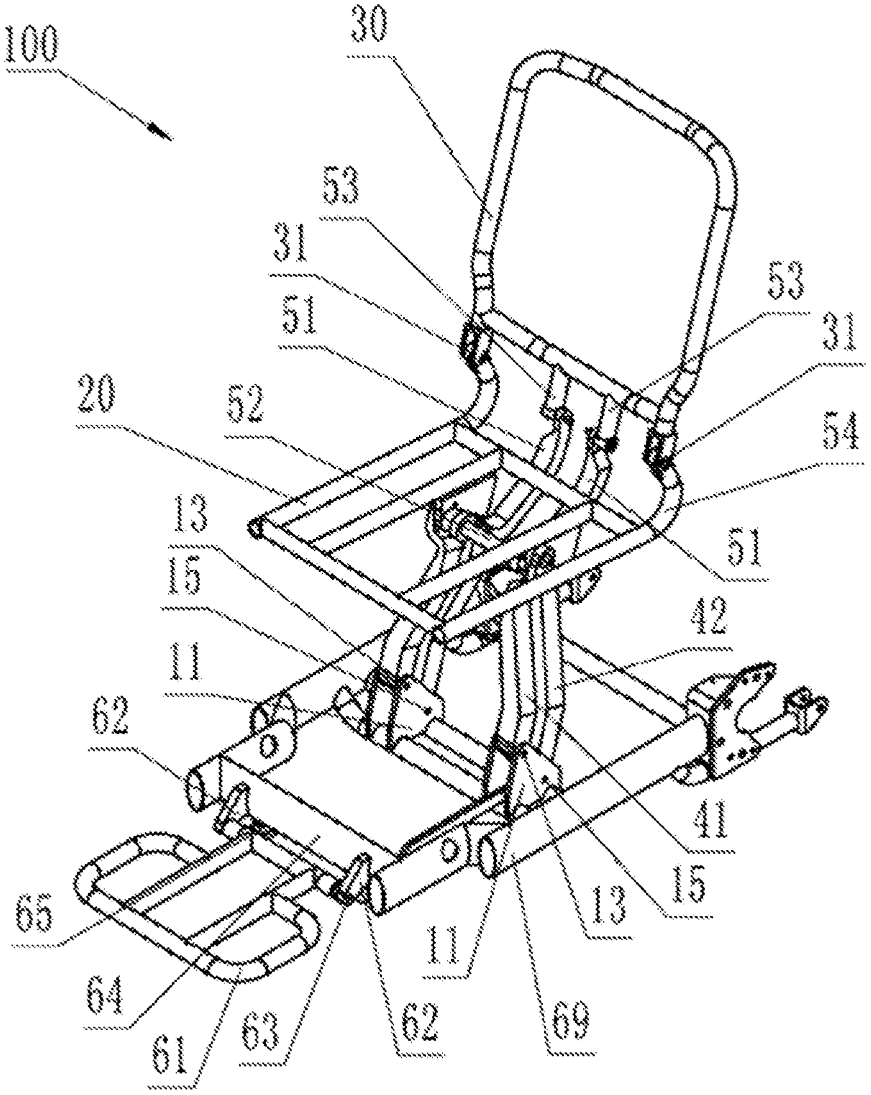
FIG. 2 is a second schematic structural diagram of a collapsible wheelchair provided by an embodiment of the present disclosure.

In an embodiment of the present disclosure, as shown in FIG. 2, in order to support the chair 20 more stably, the at least one first folding mechanism 40 includes two first folding mechanisms 40. At this time, the two first folding mechanisms 40 can be respectively installed on the left and right sides of the movable chassis 60, the first connecting bases 11 of the two first folding mechanisms 40 can be respectively installed on the left and right sides of the movable chassis 60, and the second connecting bases 12 of the two first folding mechanisms 40 can be installed on the left and right sides under the chair 20.

The collapsible wheelchair 100 further includes a first hinge rod 52, where the second connecting bases 12 of the two first folding mechanisms 40 are both provided with a first hinge hole 17; the second end of the first extension end 43 and the first end of the fourth support rod 51 are both hinged with the first hinge rod 52.

In addition, both ends of the first hinge rod 52 are telescopic. Specifically, the first hinge rod 52 extends into the first hinge holes 17 when the collapsible wheelchair 100 is switched from the folded state to the opened state. More, specifically, the first folding mechanism 40 is driven to swing away from the horizontal plane, the first hinge rod 52 slides between the second connecting bases 12 of the two first folding mechanisms 40, the second support rod 42 swings away from the horizontal plane, so that the first extending end 43 moves toward the horizontal plane; the first extension end 43 drives, through the fourth support rod 51, the chair backrest 30 to rotate around the hinge point 31 toward a direction opposite to the forward direction of the collapsible wheelchair 100, until the chair backrest 30 is under an open state. When the chair backrest 30 rotates toward the direction opposite to the forward direction of the collapsible wheelchair 100, the first hinge rod 52 slides to the first hinge hole 17, at this time, both ends of the first hinge rod 52 that are originally compressed lose the pressure from the second connecting base 12 and then extend and extend into the first hinge holes 17.

When the collapsible wheelchair 100 is switched from the open state to the folded state, the first hinge rod 52 is separated from the first hinge holes 17, and both ends of the first hinge rod 52 are compressed between the second connecting bases 12 of the two first folding mechanisms 40 and slide between the second connecting bases 12 of the two first folding mechanisms 40, at this time, the first support rod 41 and the second support rod 42 are driven to swing toward the horizontal plane, then the chair 20 is folded; the first extension end 43 swings away from the horizontal plane at the same time when the second support rod 42 swings toward the horizontal plane, which drives the first hinge rod

52 to swing away from the horizontal plane, pushes, through the fourth support rod 51, the chair backrest 30 to rotate around the hinge point 31 toward the forward direction of the collapsible wheelchair 100, until the chair backrest 30 is under the folded state.

In this embodiment of the present disclosure, the retractility of both ends of the first hinge rod 52 can be controlled by an electrical manner, also by a manual manner, and the telescopic structure of both ends of the first hinge rod 52 can be a mechanical spring, an electric spring, a hydraulic apparatus, a pneumatic apparatus, etc. The present disclosure does not specifically limit the telescopic structure of the first hinge rod 52, as long as the telescopic structure meets the use requirements.

A driving mechanism for driving the first folding mechanism 40 can act on the first support rod 41, or on the second support rod 42, or on the first extension end 43 or the first hinge rod 52, or the driving mechanism can even directly act on the chair 20. The present disclosure does not specifically limit the driving mechanism for driving the first folding mechanism 40 and the installation position thereof, as long as the first folding mechanism 40 can be driven to move.

In addition, the second folding mechanism 50 can also be driven to fold and open the collapsible wheelchair 100 provided by the present disclosure. A driving mechanism for driving the second folding mechanism 50 can act on the first extension end 43, the first hinge rod 52, the fourth support rod 51 or the sixth support rod 53, or even directly act on the chair backrest 30. The present disclosure does not specifically limit the driving mechanism for driving the second folding mechanism 50 and the installation position thereof, as long as the second folding mechanism 50 can be driven to move.

In addition, since only a drive force needs to be applied to any one of the first folding mechanism 40 and the second folding mechanism 50 and then it can be realized that the chair 20 and the chair backrest 30 can be opened or folded at the same time, the present disclosure does not specifically limit the drive force for driving the first folding mechanism 40 and the second folding mechanism 50 to move and which one of the first folding mechanism 40 and the second folding mechanism 50 is the driving force applied to, as long as any one of the first folding mechanism 40 and the second folding mechanism 50 can be driven to move.

In the embodiments of the present disclosure, the collapsible wheelchair 100 can be folded manually or electrically, and the collapsible wheelchair 100 can be folded in other ways. Taking manually folding of the collapsible wheelchair 100 provided by the present disclosure as an example, the wheelchair 100 can be directly folded after both ends of the first hinge rod 52 are contracted and separated from the first hinge hole 17, or the folded wheelchair 100 can be opened manually until both ends of the first hinge rod 52 slide into the first hinge holes 17 and extend into the first hinge holes 17.

In an embodiment of the present disclosure, similar to the above embodiments, the at least one first folding mechanism 40 includes two first folding mechanisms 40.

Figure 6:
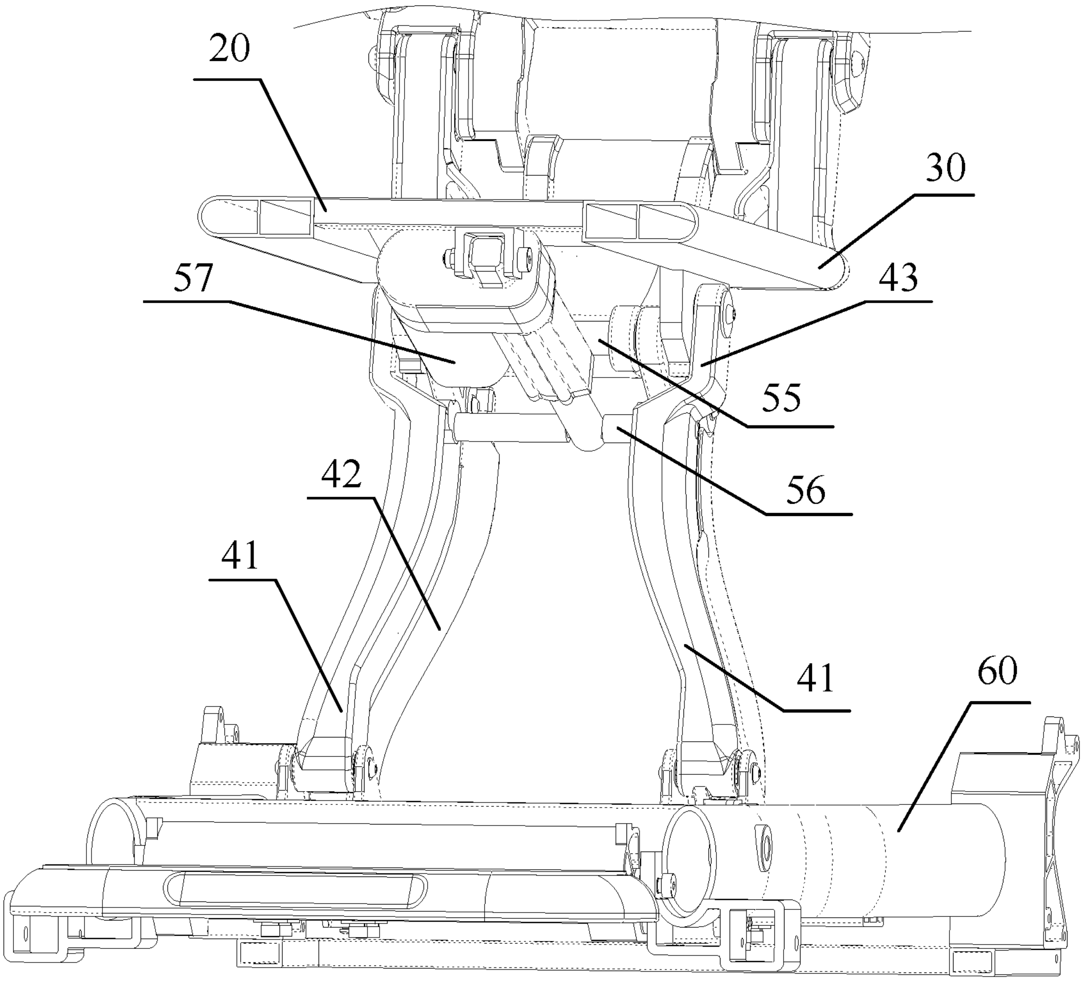
FIG. 6 is a schematic structural diagram of a collapsible wheelchair provided by another embodiment of the present disclosure.

In addition, as shown in FIG. 6, the collapsible wheelchair 100 further includes: a second hinge rod 55, with which the second end of the first extension end 43 and the first end of the fourth support rod 51 are both hinged; a first cross rod 56, connected between the first support rods 41 of the two first folding mechanisms 40 or between the second support rods 42 of the two first folding mechanisms 40; and a driving mechanism 57, connected with the first cross rod 56 and driving the first cross rod 56 to move, thereby driving the two first folding mechanisms 40 to move.

In this embodiment of the present disclosure, the driving mechanism 57 can be fixedly installed on the movable chassis 60, or under the chair 20, or at other positions of the collapsible wheelchair 100. The present disclosure does not specifically limit the installation position of the driving mechanism 57, as long as the driving mechanism 57 can be connected with the first cross rod 56 and drive the first cross rod 56 to move.

In this embodiment of the disclosure, the driving mechanism 57 may be a push-rod motor or other driving mechanisms 57 that can be connected with the first cross rod 56 and drive the first cross rod 56 to move.

In an embodiment of the present disclosure, the collapsible wheelchair 100 further includes a pedal plate 61 for resting feet of a user. The pedal plate 61 can be folded alone or together with the chair 20 and the chair backrest 30. In addition, the pedal plate 61 can also be folded manually, or by using a driving apparatus, so as to avoid the pedal plate 61 from forming a block when the user moves to the wheelchair.

When the pedal plate 61 is folded together with the chair 20 and the chair backrest 30, the collapsible wheelchair 100 further includes two third folding mechanisms corresponding to the two first folding mechanisms 40, where each of the third folding mechanisms includes: a second extension end 68, a first linkage 67 and a second linkage 66.

For each of the third folding mechanisms, a first end of the second extension end 68 is hinged with the first end of the first support rod 41, a second end of the second extension end 68 is hinged with a first end of the first linkage 67, a second end of the first linkage 67 is hinged with a first end of the second linkage 66, and a second end of the second linkage 66 is hinged with the pedal plate 61.

When the collapsible wheelchair is switched from the open state to the folded state, the first support rod 41 swings toward the horizontal plane and drives the pedal plate 61 to fold upwards through the second extension end 68; when the collapsible wheelchair is switched from the folded state to the opened state, the first support rod 41 swings away from the horizontal plane, and drives the pedal plate 61 to rotate downward and open through the second extension end 68.

In an embodiment of the present disclosure, the collapsible wheelchair 100 further includes a stopper 65, where the second linkage 66 and the pedal plate 61 are unidirectionally position-limited by the stopper 65, so as to avoid the pedal plate 61 from being excessively opened and being damaged after contacting with the ground. The stopper 65 is located at a position where the pedal 61 is hinged with the second linkage 66. When the pedal plate 61 rotates to a vertical state, the stopper 65 limits positions of the second linkage 66 and the pedal plate 61. The present disclosure does not limit the specific structure of the stopper 65, as long as it can limit the positions of the second linkage 66 and the pedal plate 61 when the pedal plate 61 rotates to the vertical state.

In an embodiment of the present disclosure, in order to facilitate the installation of the pedal plate 61, the movable chassis 60 is provided with a second cross rod 64, and the second cross rod 64 is provided with two third linkages 62, the two third linkages 62 are both provided with a second hinge hole 63, and the pedal plate 61 is hinged between the two third linkages 62 through the second hinge holes 63 of the two third linkages 62.

In an embodiment of the present disclosure, as shown in FIG. 2, in order to avoid the back 30 from being broken due to long-term use, the at least one second folding mechanism 50 includes two second folding mechanisms 50. At this time, the fourth support rods 51 of the two second folding mechanisms 50 are respectively installed at both ends of the first hinge rod 52 or the second hinge rod 55, and the second ends of the fifth support rods 54 of the two second folding mechanisms 50 are respectively fixedly connected to the left and right sides of the lower end of the chair backrest 30.

In an embodiment of the present disclosure, the at least one first folding mechanism 40 includes two first folding mechanisms 40, and the at least one second folding mechanism 50 includes two second folding mechanisms 50.

In addition, the collapsible wheelchair 100 further includes: a third hinge rod, with which the second end of the first extension end 43 and the first end of the fourth support rod 51 are hinged; a third cross rod, connected between the fourth support rods 51 of the two second folding mechanisms 50 or the fifth support rods 54 of the two second folding mechanisms 50 or the sixth support rods 53 of the two second folding mechanisms 50; and a driving mechanism, connected with the third cross rod and driving the third cross rod to move, thereby driving the two second folding mechanisms 50 to move.

In this embodiment of the present disclosure, the driving mechanism can be fixedly installed on the movable chassis 60, or under the chair 20, or at other positions of the collapsible wheelchair 100. The present disclosure does not specifically limit the installation position of the driving mechanism, as long as the driving mechanism can be connected with the third cross rod and drive the third cross rod to move.

In other embodiments of the present disclosure, the collapsible wheelchair 100 may include other numbers of the first folding mechanisms 40 and the second folding mechanisms 50.

For example, the collapsible wheelchair 100 may include one first folding mechanism 40 and one second folding mechanism 50. At this time, one end of the first folding mechanism 40 is connected to the middle of the movable chassis 60 and the other end is connected to the middle under the chair 20; the fourth support rod 51 of the second folding mechanism 50 is hinged to the middle of the first hinge rod 52 or the second hinge rod 55, and the chair 20 and the chair backrest 30 are hinged together through an elbow (the fifth support rod 54).

For another example, the collapsible wheelchair 100 may include one first folding mechanism 40 and two second folding mechanisms 50. At this time, one end of the first folding mechanism 40 is connected to the middle of the movable chassis 60 and the other end is connected to the middle under the chair 20; the fourth support rods 51 of the two second folding mechanisms 50 are respectively installed at both ends of the first hinge rod 52 or the second hinge rod 55, and the second ends of the fifth support rods 54 of the two second folding mechanisms 50 are respectively fixedly connected to the left and right sides of the lower end of the chair backrest 30.

In an embodiment of the present disclosure, the movable chassis 60 includes a chassis frame 69 having a quadrangular structure. The chassis frame 69 leaves space for an arrangement of electrical components such as batteries. Under the folded state of the collapsible wheelchair 100, the at least one first folding mechanism 40 is accommodated in the chassis frame 69, which avoids the chair 20 from interfering with a front wheel of the collapsible wheelchair 100 and the battery when the chair 20 is folded, and makes the structure design of the collapsible wheelchair 100 provided by the present disclosure compact, small and delicate.

The above specific embodiments do not constitute a limitation on the protection scope of the present disclosure. It should be understood by those skilled in the art that various modifications, combinations, sub-combinations and substitutions can be made according to design requirements and other factors. Any modification, equivalent substitution and improvement made within the spirit and principle of the present disclosure shall be contained in the protection scope of the present disclosure.

What is claimed is:

1. A collapsible wheelchair, comprising:

a movable chassis;

a chair;

a chair backrest;

at least one first folding mechanism, installed between the movable chassis and the chair; and at least one second folding mechanism, connected between the chair and the chair backrest;

wherein, the at least one first folding mechanism and the at least one second folding mechanism are connected in series and both have a four-rod linkage structure, and when the collapsible wheelchair is switched from a folded state to an open state or from the open state to the folded state, the at least one first folding mechanism and the at least one second folding mechanism are configured to move simultaneously;

wherein, each of the first folding mechanisms comprises a first support rod, a second support rod, a first connecting base and a second connecting base, wherein a first end of the first support rod and a first end of the second support rod are both hinged with the first connecting base, and a second end of the first support rod and a second end of the second support rod are both hinged with the second connecting base, and the second connecting base is fixedly connected with the chair;

wherein, each of the second folding mechanisms comprises: a fourth support rod, a fifth support rod and a sixth support rod;

wherein the collapsible wheelchair further comprises a first extension end, a first end of the first extension end is fixedly connected with the second end of the second support rod, a second end of the first extension end is hinged with a first end of the fourth support rod, a second end of the fourth support rod is hinged with a first end of the sixth support rod, a second end of the sixth support rod is fixedly connected with the chair backrest, a first end of the fifth support rod is fixedly connected with the chair, a second end of the fifth support rod is hinged with the chair backrest; and wherein, under the folded state of the collapsible wheelchair, the movable chassis, the chair, and the chair backrest are stacked in parallel with each other.

2. The collapsible wheelchair according to claim 1, wherein, a position where the first support rod is hinged with the first connecting base is higher than a position where the second support rod is hinged with the first connecting base, and a position where the first support rod is hinged with the second connecting base is higher than a position where the second support rod is hinged with the second connecting base.

3. The collapsible wheelchair according to claim 2, wherein, the at least one first folding mechanism has a parallelogram-like four-rod linkage structure.

4. The collapsible wheelchair according to claim 1, wherein, the at least one second folding mechanism has an anti-parallelogram-like four-rod linkage structure.

5. The collapsible wheelchair according to claim 4, wherein, a length of the fourth support rod is greater than a length of the first extension end and a length of the sixth support rod.

6. The collapsible wheelchair according to claim 1, wherein, the at least one first folding mechanism comprises two first folding mechanisms;

the collapsible wheelchair further comprises a first hinge rod, wherein the second connecting bases of the two first folding mechanisms are both provided with a first hinge hole; the second end of the first extension end and the first end of the fourth support rod are both hinged with the first hinge rod;

when the collapsible wheelchair is switched from the folded state to the opened state, the first hinge rod extends into the first hinge holes; and when the collapsible wheelchair is switched from the open state to the folded state, the first hinge rod is separated from the first hinge holes.

7. The collapsible wheelchair according to claim 6, further comprising: a pedal plate and two third folding mechanisms respectively corresponding to the two first folding mechanisms, and each of the third folding mechanisms comprises: a second extension end, a first linkage and a second linkage;

for each of the third folding mechanisms, a first end of the second extension end is hinged with the first end of the first support rod, a second end of the second extension end is hinged with a first end of the first linkage, a second end of the first linkage is hinged with a first end of the second linkage, and a second end of the second linkage is hinged with the pedal plate.

8. The collapsible wheelchair according to claim 7, further comprising a stopper, wherein the second linkage and the pedal plate are unidirectionally position-limited by the stopper.

9. The collapsible wheelchair according to claim 7, wherein, the movable chassis is provided with a second cross rod, and the second cross rod is provided with two third linkages, the two third linkages are both provided with a second hinge hole, and the pedal plate is hinged between the two third linkages through the second hinge holes of the two third linkages.

10. The collapsible wheelchair according to claim 1, wherein, the first connecting base is fixedly installed on the movable chassis, and the second connecting base is fixedly installed under the chair.

11. The collapsible wheelchair according to claim 1, wherein, under the open state of the collapsible wheelchair, inclination directions of the first support rod and the second support rod are the same as an inclination direction of the chair backrest.

12. The collapsible wheelchair according to claim 1, wherein, when the collapsible wheelchair is switched from the open state to the folded state, the at least one second folding mechanism is folded toward a forward direction of the collapsible wheelchair, and the at least one first folding mechanism is folded toward a direction opposite to the forward direction of the collapsible wheelchair.

13. The collapsible wheelchair according to claim 1, wherein, the movable chassis comprises a chassis frame, and under the folded state of the collapsible wheelchair, the at least one first folding mechanism is accommodated in the chassis frame.

14. The collapsible wheelchair according to claim 13, wherein, the chassis frame has a quadrangular structure.

* * * * *